(12) United States Patent  
Ham

(10) Patent No.: US 11,788,638 B2  
(45) Date of Patent: Oct. 17, 2023

(54) PRESSURE RELIEF DEVICE

(71) Applicants: HYUNDAI MOTOR COMPANY, Seoul (KR); KIA CORPORATION, Seoul (KR)

(72) Inventor: Jeong Hyun Ham, Jeonju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/847,850

(22) Filed: Jun. 23, 2022

(65) Prior Publication Data

US 2023/0265934 A1 Aug. 24, 2023

(30) Foreign Application Priority Data

Feb. 22, 2022 (KR) .................. 10-2022-0023242

(51) Int. Cl.
| | | |
|---|---|---|
| *F16K 17/38* | (2006.01) | |
| *F16K 31/00* | (2006.01) | |
| *F17C 13/04* | (2006.01) | |
| *F16K 17/00* | (2006.01) | |
| *H01M 8/04082* | (2016.01) | |

(52) U.S. Cl.
CPC .......... *F16K 17/383* (2013.01); *F16K 17/003* (2013.01); *F16K 31/002* (2013.01); *F17C 13/04* (2013.01); *F17C 2270/0763* (2013.01); *H01M 8/04201* (2013.01); *H01M 2250/20* (2013.01)

(58) Field of Classification Search
CPC .... F16K 17/383; F16K 17/003; F16K 31/002; F17C 13/04; F17C 2270/0763; H01M 8/04201; H01M 2250/20; Y10T 137/7737; Y10T 137/1797; Y10T 137/1819; Y10T 137/1812
USPC ...................................... 137/74, 72
See application file for complete search history.

(56) References Cited

U.S. PATENT DOCUMENTS

| | | | | |
|---|---|---|---|---|
| 4,280,522 A | * | 7/1981 | Pechnyo | F16K 5/0673 251/315.08 |
| 5,511,576 A | * | 4/1996 | Borland | F16K 17/383 137/72 |
| 5,632,297 A | * | 5/1997 | Sciullo | F16K 17/383 137/72 |

(Continued)

FOREIGN PATENT DOCUMENTS

| | | |
|---|---|---|
| CN | 211371398 U | 8/2020 |
| JP | 2001-050497 A | 2/2001 |

(Continued)

*Primary Examiner* — Minh Q Le  
(74) *Attorney, Agent, or Firm* — MCDONNELL BOEHNEN HULBERT & BERGHOFF LLP

(57) ABSTRACT

A pressure relief device includes a housing member having an inner space, a piston member provided in the inner space of the housing member, and a fusible member provided in a region below the piston member. The piston member includes an upper end region formed at an upper end in the up-down direction (H), and a connection region which is formed below the upper end region and extends downward from the upper end region while being connected to the upper end region. A first width (W1) of the upper end region in a left-right direction (A) is equal to a second width (W2) of the connection region in the left-right direction (A) or less than the second width (W2).

13 Claims, 2 Drawing Sheets

(56) References Cited

U.S. PATENT DOCUMENTS

| | | | |
|---|---|---|---|
| 6,286,536 B1* | 9/2001 | Kamp | F16K 17/38 137/68.13 |
| 7,150,287 B2* | 12/2006 | Kita | F16K 17/383 137/72 |
| 7,814,925 B2* | 10/2010 | Nomichi | F16K 3/265 137/72 |
| 11,236,838 B2 | 2/2022 | Ham | |
| 2001/0018929 A1* | 9/2001 | Taku | F17C 13/123 137/505 |
| 2015/0159764 A1* | 6/2015 | Peli | F16K 17/383 137/72 |
| 2016/0010758 A1* | 1/2016 | Nomichi | F16K 17/383 137/72 |
| 2020/0365917 A1* | 11/2020 | Ham | H01M 8/04089 |
| 2021/0180708 A1 | 6/2021 | Ham | |

FOREIGN PATENT DOCUMENTS

| | | |
|---|---|---|
| KR | 2017-0138755 A | 12/2017 |
| KR | 2017-0143323 A | 12/2017 |
| KR | 2018-0000058 A | 1/2018 |
| KR | 2020-0018750 A | 2/2020 |
| KR | 2021-0076757 A | 6/2021 |

\* cited by examiner

PRESSURE RELIEF DEVICE

CROSS REFERENCE TO RELATED APPLICATIONS

This application claims priority from and the benefit of Korean Patent Application No. 10-2022-0023242, filed on Feb. 22, 2022, which is hereby incorporated by reference for all purposes as if set forth herein.

TECHNICAL FIELD

Exemplary embodiments relate to a pressure relief device and, more particularly, to a thermally activated pressure relief device having a structure capable of safely discharging a gas when the pressure of the gas rises.

BACKGROUND

Thermally activated pressure relief devices (hereinafter, referred to as 'TPRDs') coupled to a tank for storing a gas normally maintain a sealed state to prevent the gas from escaping, but forms a path for discharging the gas inside the tank when the temperature of the tank or its surroundings rises, thereby preventing damage or explosion of the tank.

The TPRDs are mainly classified into a glass bulb-type and a metal melting-type. The glass bulb-type TPRD has a structure in which a glass bulb normally blocks a flow path inside the TPRD, but is broken to secure a flow path for discharging a gas when the temperature of the glass bulb exceeds a certain value. On the other hand, the metal melting-type TPRD has a structure in which a fuse member made of a low melting-point material is melted to secure a flow path for discharging a gas when the temperature thereof exceeds a certain value. In the metal melting-type TPRD among these TPRDs, a fusible member is a metal material or contain a metal material and thus strong against external shock and vibration.

However, in the metal melting-type TPRD according to the related art, the flow rate of the discharged gas is determined depending on the amount of molten fuse member. Accordingly, rapid discharge of the gas is not ensured, and thus reliability of operation performance of the TPRD is deteriorated.

SUMMARY

Exemplary embodiments of the present disclosure provide a metal melting-type TPRD that achieves rapid discharge of a gas irrespective of the amount of a molten fuse member, thereby improving reliability of operation performance.

An embodiment of the present disclosure provides a pressure relief device including a housing member having an inner space that communicates with the outside through an upper region, a piston member provided in the inner space of the housing member and capable of moving in an up-down direction (H), and a fusible member provided in a region below the piston member, wherein the piston member includes an upper end region formed at an upper end in the up-down direction (H), and a connection region which is formed below the upper end region and extends downward from the upper end region while being connected to the upper end region, wherein a first width (W1) of the upper end region in a left-right direction (A) is equal to a second width (W2) of the connection region in the left-right direction (A) or less than the second width (W2).

The pressure relief device may further include a first sealing member which surrounds an outer surface of the connection region.

The pressure relief device may further include a first back-up member which surrounds the outer surface of the connection region and is provided below the first sealing member.

The piston member may further include a protrusion region which is formed below the connection region and has a third width (W3) in the left-right direction (A) greater than the second width (W2), and a recess region which is formed below the protrusion region, extends downward from the protrusion region while being connected to the protrusion region, and has a fourth width (W4) in the left-right direction (A) smaller than the third width (W3), wherein the pressure relief device further includes a second sealing member which surrounds an outer surface of the recess region.

The pressure relief device may further include a second back-up member which surrounds the outer surface of the recess region and is provided below the second sealing member.

Brittleness of the first back-up member may be greater than brittleness of the first sealing member.

Elongation of the first sealing member may be greater than elongation of the first back-up member.

The inner space may include a first inner space which communicates with the outside through the upper region of the housing member and has a first space width (S1) in the left-right direction (A), and a second inner space which is provided below the first inner space, communicates with the first inner space, and has a second space width (S2) in the left-right direction (A) greater than the first space width (S1), wherein the connection region and the protrusion region are inserted into the second inner space.

A width of the first sealing member in the left-right direction (A) may be greater than the first space width (S1) of the first inner space.

The inner space further may include a third inner space which is provided below the second inner space, communicates with the second inner space, and has a third space width (S3) in the left-right direction (A) greater than the second space width (S2).

The pressure relief device may further include a spring member which surrounds an outer surface of the piston member and presses the piston member downward.

The spring member may be inserted into the third inner space, and a width of the spring member in the left-right direction (A) may be greater than the second space width (S2).

The pressure relief device may further include a porous member which is provided in a region below the fusible member and supports the fusible member upward.

BRIEF DESCRIPTION OF THE FIGURES

The accompanying drawings, which are included to provide a further understanding of the disclosure and are incorporated in and constitute a part of this specification, illustrate embodiments of the disclosure, and together with the description serve to explain the principles of the disclosure.

DETAILED DESCRIPTION

Hereinafter, a pressure relief device according to the present disclosure will be described with reference to the drawings.

Figure 1:
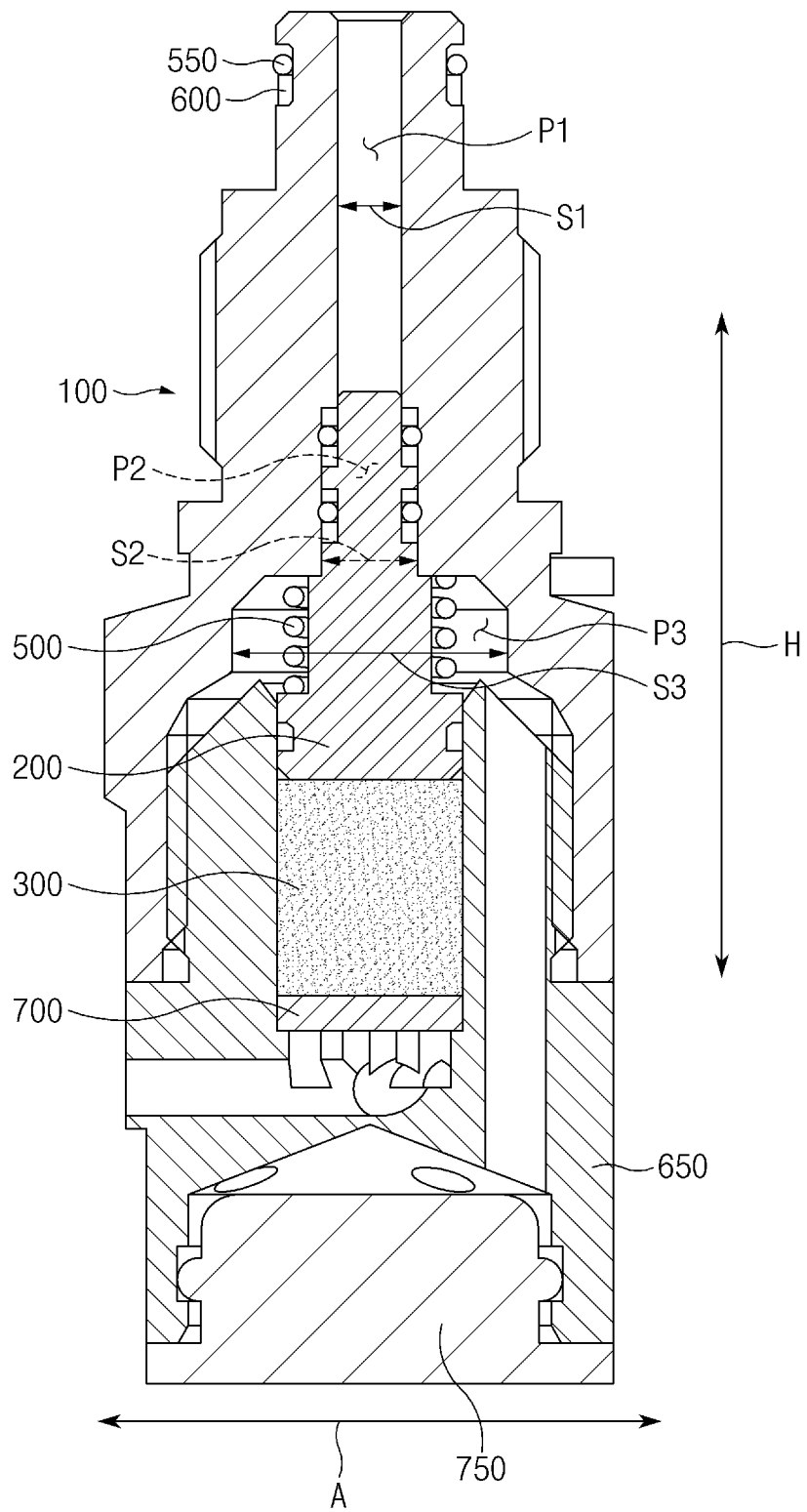
FIG. 1 is a cross-sectional view illustrating a structure of a pressure relief device according to the present disclosure.
Figure 2:
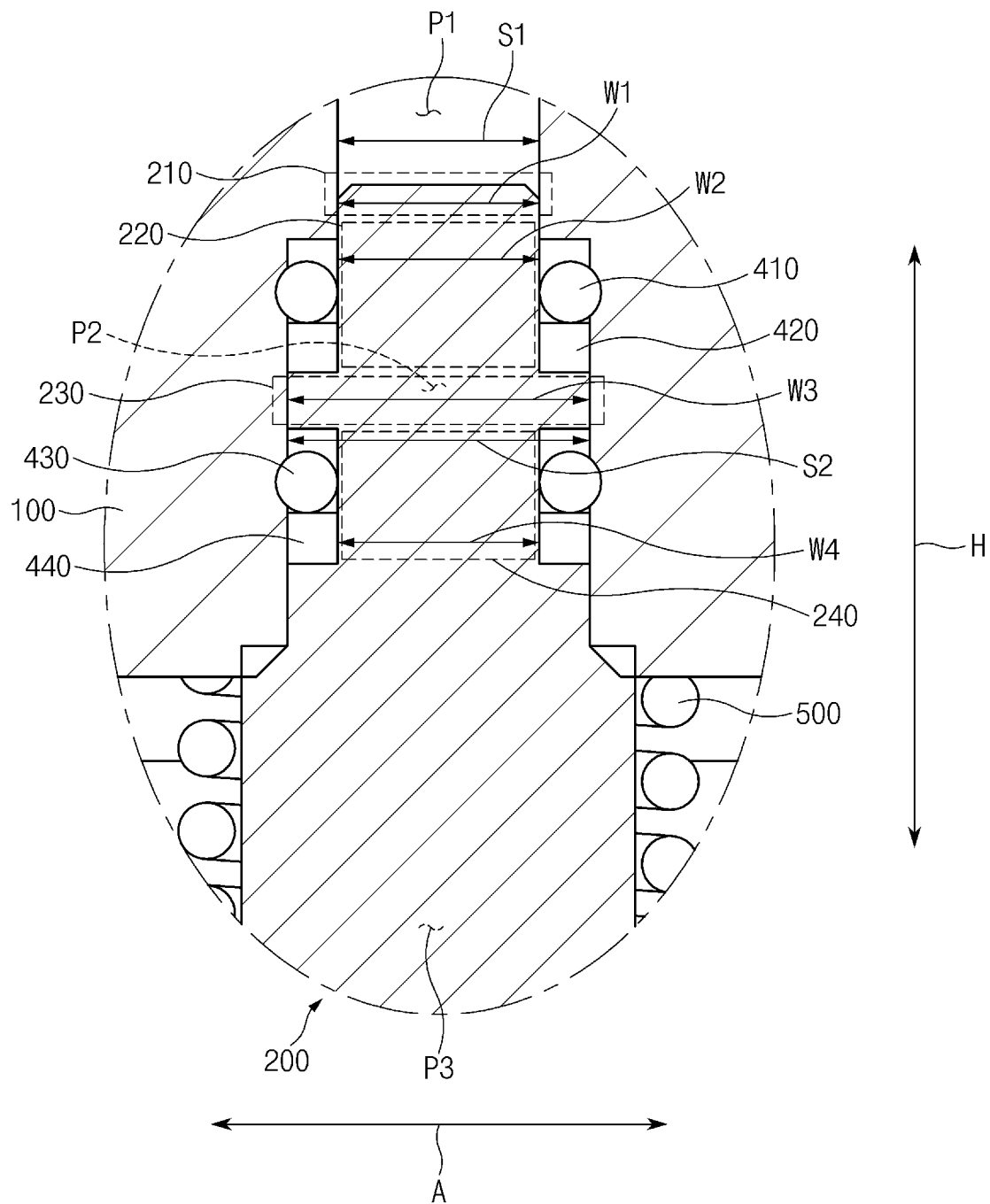
FIG. 2 is an enlarged cross-sectional view illustrating an upper portion of a piston member and peripheral portions thereof provided in the pressure relief device according to the present disclosure.

FIG. 1 is a cross-sectional view illustrating a structure of a pressure relief device according to the present disclosure, and FIG. 2 is an enlarged cross-sectional view illustrating an upper portion of a piston member and peripheral portions thereof provided in the pressure relief device according to the present disclosure.

A pressure relief device 10 according to the present disclosure is configured to be coupled to a tank for storing a gas, and may provide a path for discharging the gas stored in the tank when the temperature of the storage tank rises, thereby reducing the internal pressure of the tank. In one example, the pressure relief device 10 according to the present disclosure may be coupled to a hydrogen storage tank. For example, the pressure relief device 10 may be a thermally activated pressure relief device (TPRD).

Referring to FIGS. 1 and 2, a pressure relief device 10 may include a housing member 100 having an inner space that communicates with the outside through an upper region. When the pressure relief device 10 is coupled to a tank, the inner space formed in the housing member 100 may be fastened to a valve member (not shown) so as to communicate with an inner space of the tank. As described later, the inner space may be divided into a plurality of spaces according to the widths in a left-right direction A.

Also, the pressure relief device 10 may further include a piston member 200 provided in the inner space of the housing member 100 and capable of moving in an up-down direction H. The piston member 200 may seal the inner space of the housing member 100. The pressure relief device 10 may further include a fusible member 300 provided in a region below the piston member 200 and supporting the piston member 200 upward. The fusible member 300 may be made of a material having a low melting point. More specifically, the melting point of the fusible member 300 may be lower than the melting points of the housing member 100 and the piston member 200. In one example, the fusible member 300 may be a low melting-point alloy, and the melting point of the fusible member 300 may be about 110 degrees Celsius.

As described above, the piston member 200 may normally seal the inner space of the housing member 100. Then, when the temperature of the pressure relief device 10 rises, the fusible member 300 is melted, and the piston member 200 moves downward. Accordingly, a sealed state of the inner space by the piston member 200 is released. Thus, the gas that has flowed in through the upper region of the housing member 100 may be discharged via the inner space.

Meanwhile, the piston member 200 may include an upper end region 210 formed at an upper end in the up-down direction H, and a connection region 220 which is formed below the upper end region 210 and extends downward from the upper end region 210 while being connected to the upper end region 210.

Here, according to the present disclosure as illustrated in FIGS. 1 and 2, a first width W1 of the upper end region 210 in the left-right direction A may be equal to a second width W2 of the connection region 220 in the left-right direction A or less than the second width W2. This may be understood as that the upper end region 210 of the piston member 200 does not have a shape that protrudes in the left-right direction A.

As described above, when the piston member 200 moves downward as the fusible member 300 is melted, the gas, which has flowed in from a tank to which the pressure relief device 10 is coupled, is discharged via a space between the piston member 200 and the housing member 100 in the inner space of the housing member 100. Here, according to the present disclosure, the upper end region 210 of the piston member 200, at which the gas flowing in the inner space arrives first, has a shape that does not protrude in the left-right direction A, and thus a gap between the piston member 200 and the housing member 100 may increase. Thus, according to the present disclosure, when the fusible member 300 is melted, the gas may be rapidly discharged.

Continuing to refer to FIGS. 1 and 2, the pressure relief device 10 according to the present disclosure may further include a first sealing member 410 which surrounds an outer surface of the connection region 220, and a first back-up member 420 which surrounds the outer surface of the connection region 220 and is provided below the first sealing member 410.

The first sealing member 410 may be configured to seal the space between the housing member 100 and the piston member 200, thus allowing the inner space formed in the housing member 100 to be more effectively sealed in a normal state. The first back-up member 420 may be configured to support the first sealing member 410 upward. More specifically, the first sealing member 410 may be configured to seal the space between the housing member 100 and the piston member 200, thus preventing the gas inside the tank from being leaked via the pressure relief device 10 in the normal state.

Here, according to the present disclosure, the elongation of the first sealing member 410 may be greater than the elongation of the first back-up member 420. The elongation represents the degree to which the length of a specimen changes when tensile force is applied to the specimen. Thus, the above description of the elongation may be understood as that when tensile forces having the same magnitude are applied to the first sealing member 410 and the first back-up member 420, respectively, the amount of change in length of the first sealing member 410 may be greater than the amount of change in length of the first back-up member 420. The relatively high elongation of the first sealing member 410 may be to ensure that the first sealing member 410 more effectively presses against the inner surface of the housing member 100 and the outer surface of the piston member 200, which define the inner space, thereby increasing the sealing. In one example, the first sealing member 410 may be an O-ring made of a rubber material.

On the other hand, according to the present disclosure, brittleness of the first back-up member 420 may be greater than brittleness of the first sealing member 410. The brittleness represents the degree of fracture due to external forces. The relatively higher brittleness of the first back-up member 420 than the first sealing member 410 may be to ensure that the first back-up member 420 is made to be easily broken by the pressure of the gas when the gas is discharged as the piston member 200 descends due to the melting of the fusible member 300, thereby achieving rapid discharge of the gas.

That is, in the normal state, the position of the first sealing member 410 has to be fixed to ensure the sealing between the housing member 100 and the piston member 200. However, when there is a need to discharge the gas, the first back-up member 420 does not need to support the first sealing member 410. Thus, when the brittleness of the first back-up member 420 is relatively high, the first back-up member 420 may be easily broken by the pressure of the gas, and accordingly, the first sealing member 410 may be easily separated from the piston member 200. Thus, the gas can be rapidly discharged through a space between the housing member 100 and the piston member 200. In one example, the first back-up member 420 may include polyether ether ketone (PEEK). In another example, the first back-up member 420 may include polyamide or polyimide.

Continuing to refer to FIGS. 1 and 2, the piston member 200 may further include: a protrusion region 230 which is formed below the connection region 220, extends downward from the connection region 220 while being connected to the connection region 220, and has a third width W3 in the left-right direction A greater than the second width W2, and a recess region 240 which is formed below the protrusion region 230, extends downward from the protrusion region 230 while being connected to the protrusion region 230, and has a fourth width W4 in the left-right direction A smaller than the third width W3. This may be understood as that the piston member 200 has a shape, which protrudes in the left-right direction A, in the protrusion region 230, and the piston member 200 has a shape, which is recessed in the left-right direction A, in the recess region 240.

Here, the pressure relief device 10 may further include a second sealing member 430 which surrounds an outer surface of the recess region 240, and a second back-up member 440 which surrounds the outer surface of the recess region 240 and is provided below the second sealing member 430.

The second sealing member 430 may be a component corresponding to the first sealing member 410, and the second back-up member 440 may be a component corresponding to the first back-up member 420. Thus, the above descriptions of the first sealing member 410 and the first back-up member 420 may be applied, in the same manner, to the second sealing member 430 and the second back-up member 440, respectively.

That is, the second sealing member 430 may be configured to seal the space between the housing member 100 and the piston member 200, thus allowing the inner space formed in the housing member 100 to be more effectively sealed. The second back-up member 440 may be configured to support the second sealing member 430 upward. Also, the elongation of the second sealing member 430 may be greater than the elongation of the second back-up member 440, and the brittleness of the second back-up member 440 may be greater than the brittleness of the second sealing member 430.

Continuing to refer to FIGS. 1 and 2, the inner space of the housing member 100 described above may be divided into a plurality of spaces according to the widths in the left-right direction A.

More specifically, the inner space of the housing member 100 may include: a first inner space P1 which communicates with the outside through the upper region of the housing member 100 and has a first space width S1 in the left-right direction A, and a second inner space P2 which is provided below the first inner space P1, communicates with the first inner space P1, and has a second space width S2 in the left-right direction A greater than the first space width S1.

Here, according to the present disclosure, the connection region 220 and the protrusion region 230 may be inserted into the second inner space P2. Also, the upper end region 210 may be inserted into the first inner space P1.

Also, according to the present disclosure, as illustrated in FIGS. 1 and 2, the width of the first sealing member 410 in the left-right direction A may be greater than the first space width S1 of the first inner space P1. This may be understood as that a stepped region is formed in a boundary between the inner surface of the housing member 100, which defines the first inner space P1, and the inner surface of the housing member 100, which defines the second inner space P2. Thus, according to the present disclosure, in a state in which the fusible member 300 is not melted, it is possible to prevent the first sealing member 410 from being separated to the outside via the upper end region 210 of the piston member 200.

That is, according to the present disclosure, the width of the first sealing member 410 is greater than the first space width S1 of the first inner space P1. Thus, when the first sealing member 410 moves upward with respect to the piston member 200, the stepped region formed in the boundary between the inner surface of the housing member 100, which defines the first inner space P1, and the inner surface of the housing member 100, which defines the second inner space P2, interferes with the first sealing member 410 as illustrated in FIG. 2. Thus, even though the upper end region 210 of the piston member 200 does not protrude in the left-right direction A, it is possible to effectively prevent the first sealing member 410 from being separated from the piston member 200 before the fusible member 300 is not melted.

Continuing to refer to FIGS. 1 and 2, the inner space of the housing member 100 may further include a third inner space P3 which is provided below the second inner space P2, communicates with the second inner space P2, and has a third space width S3 in the left-right direction A greater than the second space width S2. This may be understood as that a stepped region is formed in a boundary between the inner surface of the housing member 100, which defines the second inner space P2, and the inner surface of the housing member 100, which defines the third inner space P3. Also, the pressure relief device 10 may further include a spring member 500 which surrounds the outer surface of the piston member 200 and presses the piston member 200 downward. The spring member 500 may be configured to press the piston member 200 downward and move the piston member 200 downward when the fusible member 300 is melted, and thus even in a relatively low-pressure state, the air can be rapidly discharged when the fusible member 300 is melted.

Here, the spring member 500 may be inserted into the third inner space P3, and the width of the spring member 500 in the left-right direction A may be greater than the second space width S2. Thus, the spring member 500 may be configured such that the stepped region formed in the boundary between the inner surface of the housing member 100, which defines the second inner space P2, and the inner surface of the housing member 100, which defines the third inner space P3, may press the spring member 500. Accordingly, the spring member 500 may press the piston member 200 downward.

Meanwhile, as illustrated in FIGS. 1 and 2, the pressure relief device 10 according to the present disclosure may further include: an O-ring member 550 coupled to the housing member 100 to surround the outer surface of the upper region of the housing member 100; and a back-up ring member 600 provided below the O-ring member 550 to support the O-ring member 550 upward. The O-ring member 550 may be configured to prevent a gas (e.g., hydrogen) from being leaked from a region in which the housing member 100 is fastened to a valve of the tank, and the back-up ring member 600 may be configured to support the O-ring member 550 so as to maintain the sealing ability of the O-ring member 550.

Also, the pressure relief device 10 may further include a plug member 650 which is inserted into and coupled to a through-region formed in the side surface of the lower region of the housing member 100. When the gas passes and flows through the space between the housing member 100 and the piston member 200 as the fusible member 300 is melted, the gas may be discharged from the pressure relief device 10 to the outside via an outlet formed in the plug member 650.

Also, the pressure relief device 10 may further include a porous member 700 which is provided in a region below the fusible member 300 and supports the fusible member 300 upward. In the normal state, the porous member 700 may support the fusible member 300 and prevent the piston member 200 from moving downward, but when the fusible member 300 is melted, the porous member 700 may provide a path through which a fluid formed by melting of the fusible member 300 passes. Thus, as the fusible member 300 is discharged to the outside via the porous member 700, the piston member 200 may be moved downward. Accordingly, the gas may be discharged via the pressure relief device 10. In one example, the porous member 700 may be a mesh member.

Continuing to refer to FIGS. 1 and 2, the pressure relief device 10 may further include a cap member 750 which is inserted into and coupled to the lower region of the housing member 100. The cap member 750 may be configured to prevent foreign substances from entering the inner space of the housing member 100 from the outside.

According to the present disclosure, provided is the metal melting-type TPRD that achieves the rapid discharge of the gas irrespective of the amount of the molten fuse member, thereby improving the reliability of operation performance.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

The invention claimed is:

1. A pressure relief device comprising:
 a housing member having an inner space that communicates with an outside through an upper region;
 a piston member positioned in the inner space of the housing member and capable of moving in an up-down direction (H); and
 a fusible member positioned in a region below the piston member;
 wherein the piston member comprises:
 an upper end region formed at an upper end in the up-down direction (H); and
 a connection region formed below the upper end region and extending downward from the upper end region and being connected to the upper end region;
 wherein a first width (W1) of the upper end region in a left-right direction (A) is equal to or less than a second width (W2) of the connection region in the left-right direction (A); and
 wherein the upper end region does not have a shape that protrudes in the left-right direction (A) with respect to the connection region.

2. The pressure relief device of claim 1, further comprising a first sealing member surrounding an outer surface of the connection region.

3. The pressure relief device of claim 2, further comprising a first back-up member surrounding the outer surface of the connection region, and positioned below the first sealing member.

4. The pressure relief device of claim 2, wherein the piston member further comprises:
 a protrusion region formed below the connection region, and having a third width (W3) in the left-right direction (A) greater than the second width (W2); and
 a recess region formed below the protrusion region, extending downward from the protrusion region and being connected to the protrusion region, and having a fourth width (W4) in the left-right direction (A) smaller than the third width (W3);
 wherein the pressure relief device further comprises a second sealing member which surrounds an outer surface of the recess region.

5. The pressure relief device of claim 4, further comprising a second back-up member surrounding the outer surface of the recess region, and provided below the second sealing member.

6. The pressure relief device of claim 3, wherein a brittleness of the first back-up member is greater than a brittleness of the first sealing member.

7. The pressure relief device of claim 3, wherein an elongation of the first sealing member is greater than an elongation of the first back-up member.

8. The pressure relief device of claim 4, wherein the inner space comprises:
 a first inner space communicating with the outside through the upper region of the housing member, and having a first space width (S1) in the left-right direction (A); and
 a second inner space positioned below the first inner space, communicating with the first inner space, and having a second space width (S2) in the left-right direction (A) greater than the first space width (S1);
 wherein the connection region and the protrusion region are inserted into the second inner space.

9. The pressure relief device of claim 8, wherein a width of the first sealing member in the left-right direction (A) is greater than the first space width (S1) of the first inner space.

10. The pressure relief device of claim 8, wherein the inner space further comprises a third inner space positioned below the second inner space, communicating with the second inner space, and having a third space width (S3) in the left-right direction (A) greater than the second space width (S2).

11. The pressure relief device of claim 10, further comprising a spring member surrounding an outer surface of the piston member and pressing the piston member downward.

12. The pressure relief device of claim 11, wherein the spring member is inserted into the third inner space; and
 a width of the spring member in the left-right direction (A) is greater than the second space width (S2).

13. The pressure relief device of claim 1, further comprising a porous member provided in a region below the fusible member, and supporting the fusible member upward.

* * * * *